(12) United States Patent
Chitgupakar et al.

(10) Patent No.: US 7,512,626 B2
(45) Date of Patent: *Mar. 31, 2009

(54) SYSTEM AND METHOD FOR SELECTING A DATA MINING MODELING ALGORITHM FOR DATA MINING APPLICATIONS

(75) Inventors: Milind Chitgupakar, Omaha, NE (US); Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 507 days.

This patent is subject to a terminal disclaimer.

(21) Appl. No.: 11/174,698

(22) Filed: Jul. 5, 2005

(65) Prior Publication Data

US 2007/0011188 A1    Jan. 11, 2007

(51) Int. Cl.
*G06F 7/00* (2006.01)
(52) U.S. Cl. .............................. 707/102; 707/6; 707/7; 707/8; 707/101; 706/12
(58) Field of Classification Search ....................... None
See application file for complete search history.

(56) References Cited

U.S. PATENT DOCUMENTS

| | | | |
|---|---|---|---|
| 6,189,005 B1 | 2/2001 | Chakrabarti et al. | 707/6 |
| 6,233,566 B1 * | 5/2001 | Levine et al. | 705/36 R |
| 6,278,997 B1 | 8/2001 | Agrawal et al. | 707/6 |
| 6,430,547 B1 | 8/2002 | Busche et al. | 707/1 |
| 6,539,378 B2 | 3/2003 | Gupta et al. | 707/5 |
| 6,553,366 B1 * | 4/2003 | Miller et al. | 707/2 |
| 6,567,814 B1 * | 5/2003 | Bankier et al. | 707/101 |
| 6,611,829 B1 | 8/2003 | Tate et al. | 707/2 |
| 6,629,095 B1 | 9/2003 | Wagstaff et al. | 707/5 |
| 6,651,048 B1 | 11/2003 | Agrawal et al. | 707/2 |
| 6,675,164 B2 * | 1/2004 | Kamath et al. | 707/6 |
| 6,687,693 B2 | 2/2004 | Cereghini et al. | 707/6 |
| 6,687,695 B1 | 2/2004 | Miller et al. | 707/6 |

(Continued)

OTHER PUBLICATIONS

Kumar et al.; High Performance Data Mining Tutorial PM-3; pp. 309-425.

(Continued)

*Primary Examiner*—Etienne P LeRoux
*Assistant Examiner*—Mohammad S Rostami
(74) *Attorney, Agent, or Firm*—Schmeiser, Olsen & Watts; Anna Linne

(57) ABSTRACT

A computing system and method for selecting a data mining modeling algorithm. The computing system comprises a computer readable medium and computing devices electrically coupled through an interface apparatus. A plurality of different data mining modeling algorithms and test data are stored on the computer readable medium. Each of the computing devices comprises a data subset from a plurality of data subsets. A technique is selected for generating a data mining model applied to each of the data subsets. Each of the different data mining modeling algorithms is run simultaneously to generate an associated data mining model on each of the computing devices. Each of the data mining models is compared to the test data to determine a best data model. A best data mining modeling algorithm from the different data mining modeling algorithms is selected in accordance with the best data mining model.

36 Claims, 4 Drawing Sheets

U.S. PATENT DOCUMENTS

| | | | |
|---|---|---|---|
| 6,687,696 | B2 | 2/2004 | Hofmann et al. ............... 707/6 |
| 6,718,322 | B1 | 4/2004 | Brye ............................. 707/3 |
| 6,718,338 | B2 | 4/2004 | Vishnubhotla .............. 707/102 |
| 6,772,166 | B1* | 8/2004 | Hildreth ..................... 707/102 |
| 6,775,831 | B1* | 8/2004 | Carrasco et al. ............. 718/100 |
| 7,020,631 | B2* | 3/2006 | Freeman et al. ........... 705/36 R |
| 7,039,654 | B1* | 5/2006 | Eder ....................... 707/104.1 |
| 7,092,941 | B1* | 8/2006 | Campos ........................ 707/6 |
| 7,143,046 | B2* | 11/2006 | Babu et al. .................. 704/500 |
| 7,219,099 | B2* | 5/2007 | Kuntala et al. ............. 707/100 |
| 7,349,919 | B2* | 3/2008 | Russell et al. ............... 707/102 |
| 2001/0051947 | A1* | 12/2001 | Morimoto et al. .......... 707/100 |
| 2002/0059202 | A1* | 5/2002 | Hadzikadic et al. ............ 707/3 |
| 2002/0077790 | A1 | 6/2002 | Blsgaard-Bohr et al. ....... 703/2 |
| 2002/0083067 | A1* | 6/2002 | Tamayo et al. .............. 707/100 |
| 2002/0128997 | A1* | 9/2002 | Kil et al. ........................ 707/1 |
| 2002/0138492 | A1* | 9/2002 | Kil ............................. 707/100 |
| 2002/0194159 | A1* | 12/2002 | Kamath et al. .................. 707/2 |
| 2002/0198889 | A1* | 12/2002 | Vishnubhotla .............. 707/101 |
| 2003/0065663 | A1* | 4/2003 | Chu ............................. 707/10 |
| 2003/0088491 | A1* | 5/2003 | Liu et al. ....................... 705/36 |
| 2003/0217033 | A1* | 11/2003 | Sandler et al. .................. 707/1 |
| 2004/0015386 | A1* | 1/2004 | Abe et al. ..................... 705/10 |
| 2004/0128287 | A1 | 7/2004 | Keller et al. .................... 707/3 |
| 2004/0267729 | A1* | 12/2004 | Swaminathan et al. ......... 707/3 |
| 2005/0114360 | A1* | 5/2005 | Russell et al. ............... 707/100 |
| 2006/0085422 | A1* | 4/2006 | Moyaux et al. ............... 707/10 |

OTHER PUBLICATIONS

Steingold et al.; Measuring Real-Time Predictive Models; 0-7695-1119-8/01 2001 IEEE; pp. 649-650.

Kamran Sartipi; Software Architecture Recovery based on Pattern Matching; 1063-6773/03 2003 IEEE; 4 pages.

Mark Last; A Compact and Accurate Model for Classification; 1041-4347/04 2004 IEEE; IEEE Transactions on Knowledge and Data Engineering, vol. 16, No. 2, Feb. 2004; pp. 203-215.

Mardia et al.; Association Rules for Web Data Mining in WHOWEDA; 0-7695-1022-1/01 2001 IEEE; pp. 227-233.

Jin et al.; A Super-Programming Approach for Mining Association Rules in Parallel on PC Clusters; IEEE Transactions on Parallel and Distributed Systems, vol. 15, No. 9, Sep. 2004; pp. 783-793.

Allinson et al.; Interactive and Semantic Data Visualization using Self-Organising Maps; pp. 1-9.

Pan et al.; Hybrid Neural Network and C4.5 For Missue Detection; 0-7803-7865-2/03 2003 IEEE; 2003 International Conf. Machine Learning and Cybernetics; vol. 4 of 5; pp. 2463-2467.

Vafaie et al.; Improving Performance of Inductive Models Through an Algorithm and Sample Combination Strategy; International Journal of Artificial Intelligence Tools; Dec. 2001, vol. 10, No. 4; pp. 555-572.

Lee et al. Neural-Based Approaches for Improving the Accuracy of Decision Trees; Y. Kambayashi, W. Winiwarter, M. Arikawa (Eds.); DaWaK 2002, LNCS 2454; pp. 114-123, 2002.

Sousa et al.; Modeling Charity Donations Using Target Selection for Revenue Maximization; 0-7803-7810-5/03 2003 IEEE; The 12th IEEE International Conf. on Fuzzy Systems; vol. 1; pp. 654-659.

Hall et al.; Why are Neural Networks Sometimes Much More Accurate than Decision Trees; An Analysis on a Bio-Informatics Problem 0-7803-7952-7/03 2003 IEEE; SMC '03 Conference Proceedings, vol. 3 of 5; pp. 2851-2856.

Szupiluk et al.; Independent Component Analysis as Postprocessing Stage in Data Mining; AI-Meth-2003—Artificial Intelligence Methods; Nov. 5-7, 2003, Gliwice, Poland; pp. 311-314.

Feng et al.; Data mining techniques applied to predictive modeling of the knurling process; IIE Transactions (2004) 36, 263; 0740-817X print / 1545-8830 online; DOI: 10.1080/07408170490274214.

Hossain et al.; A study of re-sampling methods with regression modeling; Third International Conference on Data Mining, Data Mining III; pp. 83-91, 2002.

Ros et al.; Development of predictive models by adaptive fuzzy partitioning. Application to compounds active on the central nervous system; Chemometrics and Intelligent Laboratory Systems 67 (2003); pp. 29-50.

* cited by examiner

SYSTEM AND METHOD FOR SELECTING A DATA MINING MODELING ALGORITHM FOR DATA MINING APPLICATIONS

BACKGROUND OF THE INVENTION

1. Technical Field

The present invention relates to a system and associated method for selecting a data mining modeling algorithm.

2. Related Art

Selecting a technique to locate specific data from a large amount of data is typically very time consuming. Therefore there exists a need for a time efficient procedure to select a technique to locate specific data from a large amount of data.

SUMMARY OF THE INVENTION

The present invention provides a data mining method, comprising:

providing a computing system comprising a computer readable medium and computing devices electrically coupled through an interface apparatus, wherein a plurality of different data mining modeling algorithms and test data are stored on said computer readable medium, wherein each of said computing devices comprises at least one central processing unit (CPU) and an associated memory device, wherein data has been divided by the computing system into a plurality of data subsets, and wherein each of said associated memory devices comprises a data subset from said plurality of data subsets;

selecting a technique for generating a data mining model applied to each of said data subsets;

running simultaneously, each of said different data mining modeling algorithms using said selected technique to generate an associated data mining model on each of said computing devices;

comparing each of said data mining models on each of said computing devices to said test data to determine a best data model of said data mining models; and determining, a best data mining modeling algorithm from said different data mining modeling algorithms in accordance with said selected technique, wherein said best data mining modeling algorithm is the data mining modeling algorithm that is associated with said best data mining model.

The present invention provides a computing system comprising a processor coupled to a computer readable medium and computing devices electrically coupled through an interface apparatus, wherein said computer readable medium comprises a plurality of different data mining modeling algorithms, test data, and instructions that when executed by the processor implement a data mining method, wherein each of said computing devices comprises at least one central processing unit (CPU) and an associated memory device, wherein data has been divided by the computing system into a plurality of data subsets, and wherein each of said associated memory devices comprises a data subset from said plurality of data subsets, said method comprising the computer implemented steps of:

selecting a technique for generating a data mining model applied to each of said data subsets;

running simultaneously, each of said different data mining modeling algorithms using said selected technique to generate an associated data mining model on each of said computing devices;

comparing each of said data mining models on each of said computing devices to said test data to determine a best data model of said data mining models; and determining, a best data mining modeling algorithm from said different data mining modeling algorithms in accordance with said selected technique, wherein said best data mining modeling algorithm is the data mining modeling algorithm that is associated with said best data mining model.

The present invention provides a process for integrating computing infrastructure, comprising integrating computer-readable code into a computing system, wherein the code in combination with the computing system comprises a computer readable medium and computing devices electrically coupled through an interface apparatus, wherein a plurality of different data mining modeling algorithms and test data are stored on said computer readable medium, wherein each of said computing devices comprises at least one central processing unit (CPU) and an associated memory device, wherein data has been divided by the computing system into a plurality of data subsets, and wherein each of said associated memory devices comprises a data subset from said plurality of data subsets, and wherein the code in combination with the computing system is adapted to implement a method for performing the steps of:

selecting a technique for generating a data mining model applied to each of said data subsets;

running simultaneously, each of said different data mining modeling algorithms using said selected technique to generate an associated data mining model on each of said computing devices;

comparing each of said data mining models on each of said computing devices to said test data to determine a best data model of said data mining models; and determining, a best data mining modeling algorithm from said different data mining modeling algorithms in accordance with said selected technique, wherein said best data mining modeling algorithm is the data mining modeling algorithm that is associated with said best data mining model.

The present invention provides a computer program product, comprising a computer usable medium having a computer readable program code embodied therein, said computer readable program code comprising an algorithm adapted to implement a data mining method within a computing system, said computing system comprising a computer readable medium and computing devices electrically coupled through an interface apparatus, wherein a plurality of different data mining modeling algorithms and test data are stored on said computer readable medium, wherein each of said computing devices comprises at least one central processing unit (CPU) and an associated memory device, wherein data has been divided by the computing system into a plurality of data subsets, and wherein each of said associated memory devices comprises a data subset from said plurality of data subsets, said method comprising the steps of:

selecting a technique for generating a data mining model applied to each of said data subsets;

running simultaneously, each of said different data mining modeling algorithms using said selected technique to generate an associated data mining model on each of said computing devices;

comparing each of said data mining models on each of said computing devices to said test data to determine a best data model of said data mining models; and determining, a best data mining modeling algorithm from said different data mining modeling algorithms in accordance with said selected technique, wherein said best data mining modeling algorithm is the data mining modeling algorithm that is associated with said best data mining model.

The present invention advantageously provides a system and associated method comprising a time efficient procedure to select a technique to locate specific data from a large amount of data.

DETAILED DESCRIPTION OF THE INVENTION

Figure 1:
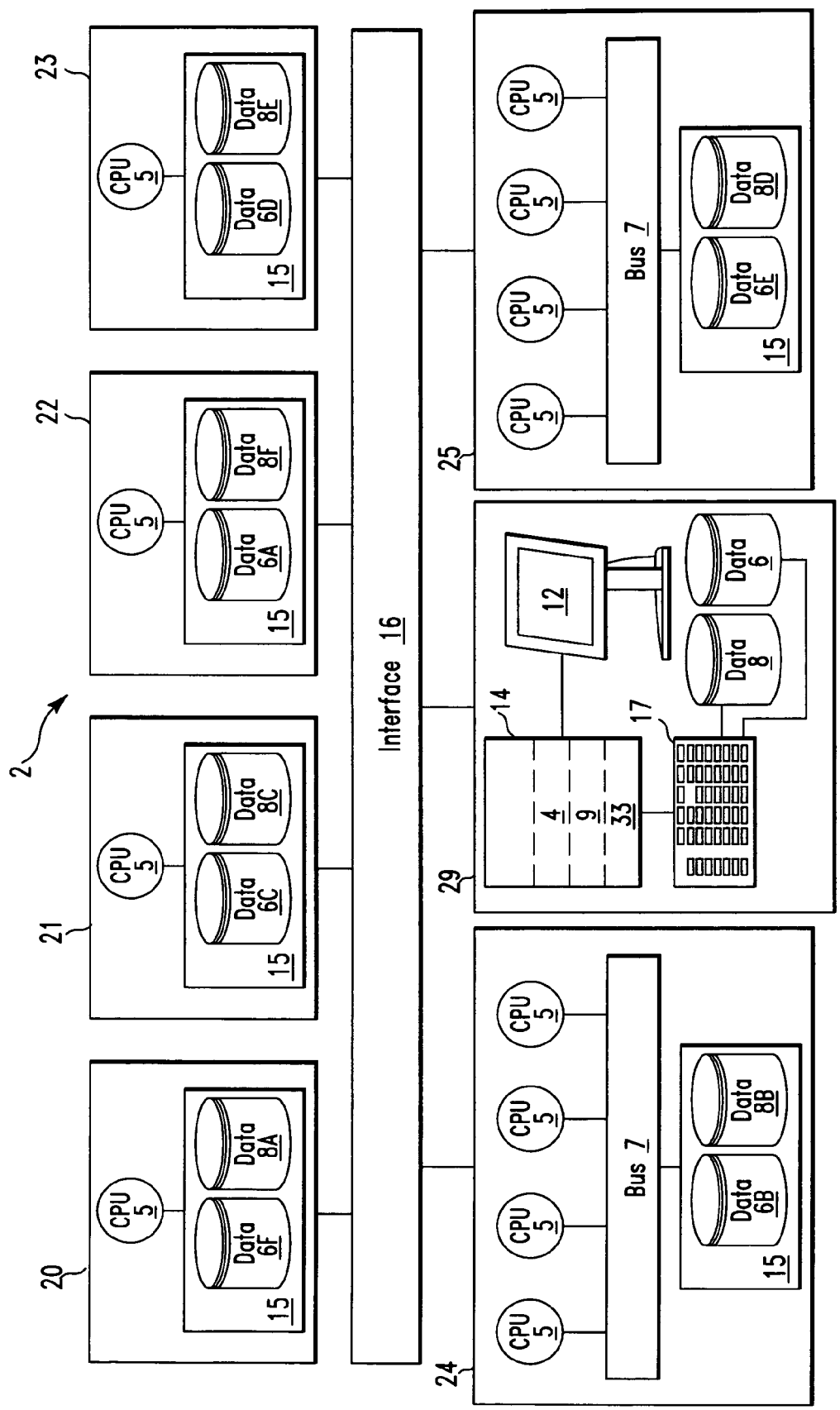
FIG. 1 illustrates a block diagram view of a database system for selecting a best data mining modeling algorithm for generating data mining models, in accordance with embodiments of the present invention.

FIG. 1 illustrates a block diagram view of a database system 2 for determining a best data mining modeling algorithm for generating data mining models, in accordance with embodiments of the present invention. The database system 2 may alternatively be a computing system. A database system (e.g., database system 2) executes a data mining modeling algorithm(s) on data in accordance with a selected technique to create a plurality of data mining models. Data mining models may be used for, inter alia, predicting a customer(s) (i.e., a candidate) response and acceptance probability to a marketing offer(s) for a product or service from an entity (e.g., a business). The data mining modeling algorithm may comprise any type of data mining modeling algorithm including, inter alia, a decision tree algorithm, a clustering algorithm, a radial basis function algorithm, a linear regression algorithm, an associations algorithm, and a neural network algorithm, etc. A data mining model is generated using existing customer data (e.g., customer behavioral data) such as, inter alia, purchasing history, returned-items history, payment history, promotional offers history, demographic data regarding the customer, etc. A data mining model may be used by an entity (e.g., a company offering products or services such as, inter alia, credit cards, consumer products, mortgages, etc.) to predict future customer behavior (i.e., propensity to respond to a product or service offer) based on an analysis of numerous customer attributes (e.g., purchasing history, returned-items history, payment history, promotional offers history, demographic data regarding, etc.) from the past. The accuracy of the prediction is tied to the ability of a data mining professional to generate and test numerous data mining models, using various data mining modeling algorithm(s), to determine both a "best" data mining modeling algorithm and "best" data mining model having a highest degree of correlation to a desired product offer or service offer with respect to a customer(s). Certain types of data mining modeling algorithms generate better (i.e., more predictive) data models from certain types of data. Therefore, the database system must select a "best" data mining modeling algorithm based on data type. The data mining modeling algorithm selection process comprises executing different types of data mining modeling algorithms on data subsets comprising a same type of data to generate data models. The generated data models are compared to test (or results) data comprising a known outcome using a selected technique (e.g., a lift chart technique as defined, infra, a root mean squared technique as defined, infra, etc) and a best (i.e., a most predictive) data model is selected. The data mining modeling algorithm that is associated with the "best" data model (i.e., data mining modeling algorithm that generated the "best" data model from the associated data subset) is considered the "best" data mining modeling algorithm. The test data comprises known data. For example, the test data may comprise, inter alia, data related to a specific marketing offer (e.g., product or service) accepted by a group of candidates. The "best" data mining modeling algorithm is now used to generate a plurality of data models from data comprising a specific data type.

The database system (e.g., database system 2 in FIG. 1) comprises existing customer data (e.g., data 6 in FIG. 1) divided or allocated into a first plurality of individual data subsets (e.g., data subsets 6A . . . 6F in FIG. 1) within individual computing devices or nodes (e.g., computing devices 20 . . . 25 in FIG. 1). The first plurality of individual data subsets comprise an allocated portion of the total customer data. Each data subset of the first plurality of data subsets is defined as 1/N multiplied by the total data set, wherein N is the total number of nodes or individual computing devices. For example, a 100 node (i.e., 100 computing device) parallel system would allocate $1/100^{th}$ of the total data set (e.g., data 6) on each node. The total data may be allocated among the nodes uniformly (as in the previous example), randomly (e.g., using a hash algorithm), or the data may be allocated among the nodes according to a business rule, such as, inter alia, a customer number. Once the total data is allocated and stored across the nodes of the database system, the first plurality of data subsets are available for access to generate data mining models. The first plurality of data subsets may be allocated among the nodes in the database system as the data is entered into the database system. A technique is selected for selecting a "best" data mining modeling algorithm and generating data mining models applied to each of a second plurality data subsets and determining a "best" data mining model. The technique may comprise any technique including, inter alia, a lift chart technique as defined, infra, a root mean squared technique as defined, infra, etc. A coordinator node (e.g., administrator computing apparatus 29) applies a plurality of different types of data mining modeling algorithms to the first plurality of data subsets in each node simultaneously to generate data models. The generated data models are compared to test (or results) data (e.g., test data 4 in FIG. 1) comprising a known outcome using the selected technique (e.g., a lift chart technique as defined, infra, a root mean squared technique as defined, infra, etc) and a "best" (i.e., a most predictive) selection data model is selected. The data mining modeling algorithm that is associated with the "best" selection data model (i.e., data mining modeling algorithm that generated the "best" data model) is considered the "best" data mining modeling algorithm. The "best" data mining modeling algorithm is applied by the coordinator node (e.g., administrator computing apparatus 29) to a second plurality of data subsets (e.g., data subsets 8A-8F in FIG. 1) simultaneously to generate in accordance with the selected technique and compare numerous data mining models. The second plurality of data subsets are allocated across the nodes of the database system in a same manner as the first plurality of data subsets. The data mining modeling algorithm may comprise any type of data mining modeling algorithm including, inter alia, a decision tree algorithm, a clustering algorithm, a radial basis function algorithm, a linear regression algorithm, an associations algorithm, and a neural network algorithm, etc. Each of the above mentioned data mining modeling algorithms are defined, infra. An output from the generated data mining models comprises a numerical description of an "expected behavior(s)" for a customer(s). By comparing results of these "expected behaviors" at a coordinator node (e.g., administrator computing apparatus 29) in accordance with the selected technique in the database system, a "best" data mining model may be selected. The "best" data mining model comprises a highest degree of correlation to a desired product or service offer with respect to a customer(s). The database system 2 comprises computing devices 20, 21, 22, 23, 24, and 25, electrically connected to an interface 15. The interface 15 may comprise any type of interface known to a person of ordinary skill in the art including, inter alia, a local area network (LAN), etc. Additionally, the database system 2 comprises an administrator computing apparatus 29 electrically connected to an interface 15. Each of computing devices 20, 21, 22, and 23 comprises a single central processing unit (CPU) 5 and a memory unit 15. Each of computing devices 24 and 25 comprises a plurality of CPUs 5 connected to a memory unit 15 through a bus 7. The computing devices 24 and 25 are symmetric multiprocessing (SMP) computing devices. An SMP computing device is a computing device comprising multiple CPUs to complete individual processes simultaneously. The database system 2 may comprise an unlimited number of computing devices similar to: the computing devices 20 . . . 23, the computing devices 24 . . . 25, or a combination of computing devices similar to the computing devices 20 . . . 23 and the computing devices 24 . . . 25. The database system 2 may comprise only computing devices similar to the computing devices 20 . . . 23 (i.e., comprising a single CPU). As a first alternative, the database system 2 may comprise only computing devices similar to the computing devices 24 . . . 25 (i.e., SMP computing devices). As a second alternative, the database system 2 may comprise a combination of computing devices (unlimited number) similar to the computing devices 20 . . . 23 and the computing devices 24 . . . 25 as illustrated in FIG. 1. The database system 2 illustrated in FIG. 1 comprises a massively parallel processing (MPP) computer system comprising single CPU 5 computing devices (i.e., computing device 20 . . . 23) and SMP computing devices (i.e., computing device 25 . . . 25). An MPP computer system is a computer system that comprises separate CPUs running in parallel (i.e., simultaneously) to execute a single program. The administrator computing apparatus 29 comprises a computer 14, an input device 17, an output device 12, a database managing software application 9, test data 4, and data mining modeling algorithms 33. The database managing software application 9 may comprise any type of database manager software including, inter alia, DB2 database management system by IBM, etc. The computer 14 may comprise any type of computer known to a person of ordinary skill in the art including, inter alia, a personal computer, a server computer, etc. The input device 17 may comprise any type of input device known to a person of ordinary skill in the art including, inter alia, a keyboard, a computer disc drive, a keypad, a network connection, etc. The output device 12 may comprise any type of output device known to a person of ordinary skill in the art including, inter alia, a monitor, a printer, etc. The administrator computing apparatus 29 may access and send instructions, programs and/or copies of the database managing software application 9 to each of the memory devices 15 within each of the computing devices 20 . . . 23 and 24 . . . 25. Each of the computing devices 20 . . . 23 and 24 . . . 25 may only access their own memory device 15 and may not access each other's memory devices 15. Streams of data 6 and 8 are inputted into the administrator computing apparatus 29 through the input device 17. The administrator computing apparatus 29 divides the streams of data 6 and 8 into a plurality of data subsets 6A . . . 6F and a plurality of data subsets 8A . . . 8F. The streams of data 6 and 8 may comprise steady streams of data. Alternatively, the streams of data 6 and 8 may comprise streams of data inputted through the input device 17 in intervals. The administrator computing apparatus 29, randomly or by use of a business rule, sends each of the data subsets 6A . . . 6F and each of the data subsets 8A . . . 8F to a different one of computing devices 20, 21, 22, 23, 24, or 25. A technique is selected for selecting a "best" data mining modeling algorithm for generating data mining models from each of the data subsets 6A . . . 6F and determining a "best" data mining model. The technique may comprise any technique including, inter alia, a lift chart technique as defined, infra, a root mean squared technique as defined, infra, etc. The stream of selection data 6 is inputted into the administrator computing apparatus 29 through the input device 17. The administrator computing apparatus 29 divides the stream of selection data 6 into a plurality of data subsets 6A . . . 6F. The administrator computing apparatus 29 applies a plurality of different types of data mining modeling algorithms to each of data subsets 6A . . . 6F within each of computing devices 20 . . . 23 and 24 . . . 25 to simultaneously to generate selection data models. The administrator computing apparatus 29 compares the generated selection data models to test (or results) data 4 comprising a known outcome using the selected technique (e.g., a lift chart technique as defined, infra, a root mean squared technique as defined, infra, etc) and a best (i.e., a most predictive) selection data model is selected. The data mining modeling algorithm that is associated with the "best" selection data model (i.e., data mining modeling algorithm that generated the "best" data model) is considered the "best" data mining modeling algorithm. The data subsets 6A . . . 6F may now be removed from the database system 2. The "best" data mining modeling algorithm 33 is applied by the administrator computing apparatus 29 to each of data subsets 8A . . . 8F within each of computing devices 20 . . . 23 and 24 . . . 25 to simultaneously generate and compare numerous data mining models in accordance with the selected technique and select a best data mining model. The "best" data mining modeling algorithm 33 may comprise any type of data mining modeling algorithm including, inter alia, a decision tree algorithm, a clustering algorithm, a radial basis function algorithm, a linear regression algorithm, an associations algorithm, and a neural network algorithm. A decision tree algorithm comprises a method for dividing the data subsets into a tree with an objective of predicting an outcome by using a "divide and conquer" approach. A clustering algorithm comprises placing data subsets into groups otherwise known as clusters whereby all the customers are "similar". A radial basis function algorithm comprises a method referred to as supervised learning (alternative examples in same a class as supervised learning may be time-series analysis, multivariate analysis, etc.). A linear regression algorithm comprises a method of fitting a line to a set of observations such as to minimize the scatter of the original pattern. An association's algorithm comprises a method used for discovering regularities in a data subset and generally predicts different things. A neural network algorithm comprises a computing method based parallel architecture. Neural networks comprise simple processing elements, a high degree of interconnection, simple scalar messages, and adaptive interaction between elements. The administrator computing apparatus 29 using a selected technique compares each of the generated data mining models to each other and a "best" data mining model is determined. The "best" data mining model comprises a highest degree of correlation to a desired product offer or service offer with respect to a customer(s). The "best" data mining model may be determined using a plurality of techniques including, inter alia, a lift chart technique, a root mean squared technique, etc. A lift chart technique comprises calculating a measure of the effectiveness of a predictive model (i.e., data mining model) as a ratio between results obtained with and without the predictive model. For example, a lift chart technique comprises using a measurement comprising a determination of how much better (or worse) a data mining model predicted results for a given case set would be in comparison to random selection. A lift is typically calculated by dividing a percentage of expected response predicted by the data mining model by the percentage of expected response predicted by a random selection. For example, if a normal density of response to a direct mail campaign for a product offer or service offer is 10 percent, a determination may be made by focussing on a top quartile of the case set predicted to respond to the campaign by the data mining model. The determination comprises a density of response increasing to 30 percent. Therefore the lift would be calculated at 3, or 30/10. A root mean squared technique comprises a special form of error rate for a prediction involving continuous, ordered attributes. The mean-squared error is the measurement of variation between a predicted value and an actual value. Subtracting the two values and squaring the result provides the rate of squared error. The rate of squared error is averaged over all predictions for the same attribute to provide an estimate of variation for a given prediction. The result is squared to ensure that all errors are positive and can be added together when the average is taken. Additionally, the result is squared to weigh widely varying prediction values. For example, if a prediction for unit sales (in thousands) for one store is 50 and the actual unit sales (in thousands) for the store was 65, the mean squared error would be 65−50=15, raised to the power of 2, or 225.

Figure 2:
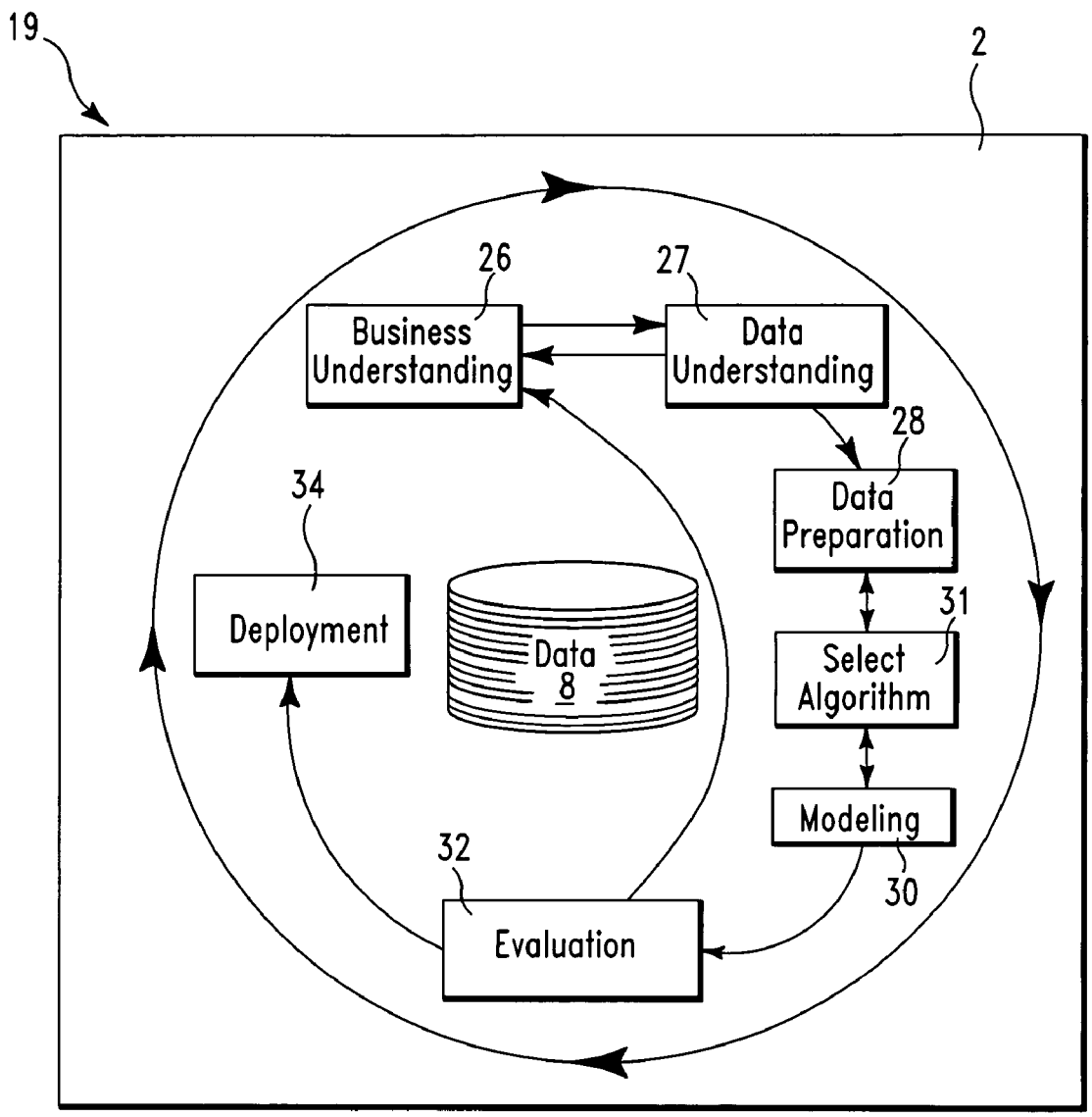
FIG. 2 illustrates a block diagram comprising an algorithm for implementing the database system 2 of FIG. 1 for selecting a data mining modelling algorithm and producing a propensity to lapse data mining model, in accordance with embodiments of the present invention.

FIG. 2 illustrates a block diagram comprising an algorithm 19 for implementing the database system 2 of FIG. 1 for selecting a data mining modelling algorithm and producing a propensity to lapse data mining model, in accordance with embodiments of the present invention. Step 26 comprises a process for building a business understanding with the underlying business issues associated with lapsing one's policy/product in the customer's domain. Step 27 comprises using the information from step 26 to source a set of variables from the existing database/client spreadsheets (i.e., data 8). This is typically undertaken as an iterative process. A key to building a predictive model is finding evidence of attrition within the historical population (i.e., customer database). Step 28 comprises a data preparation phase requiring performing exploratory data analysis on the set of chosen variables and undertaking some necessary mathematical transformations. For example, a number of weeks a policy is in force may be determined by subtracting the current date from the date the policy was in force to calculate the number of weeks. In step 31, a best data mining modelling algorithm is selected as described in the description of FIG. 1. In Step 30, data mining models are generated using the best data mining modelling algorithm and the data models are evaluated so that the population (i.e., customer data) may be divided into several samples for training purposes. There are two reasons for dividing the population (i.e., customer data) into several samples. A first reason for dividing the population (i.e., customer data) into several samples is to reduce a run time, by reduction in data mining model complexity. A second reason for dividing the population (i.e., customer data) into several samples is to try to unbias the data samples. Typically a number of attrition for the population are few and therefore the attrition are overloaded by statistics of the portion of the population that may not accept a product or service offer. By choosing smaller populations to compare against each other, more representative data mining models may be generated. Typically, an entity may want to select as many training cases (i.e., samples) as possible when creating a data mining model, but time limitations typically reduce an actual number of training cases selected, thereby ensuring that the training case set (i.e., samples) closely represents the density and distribution of the production case set. A largest possible training case set may be selected to smooth a distribution of training case attributes. The process of creating such a representative set of data, called sampling, is best handled by selecting records completely at random. Such random sampling should provide a truly unbiased view of the data. As a result of step 30, a plurality of data mining models are generated. In step 32, data mining models that have been generated are stored and used for later comparison to each other to select a most effective data mining model (i.e., a "best" data mining model). A "best" data mining model may be selected using a plurality of techniques including, inter alia, a lift chart technique, a root mean squared technique, etc. as described in the description of FIG. 1. In step 34, a "best" data mining model is selected and deployed with respect to a product offer or service offer.

Figure 3:
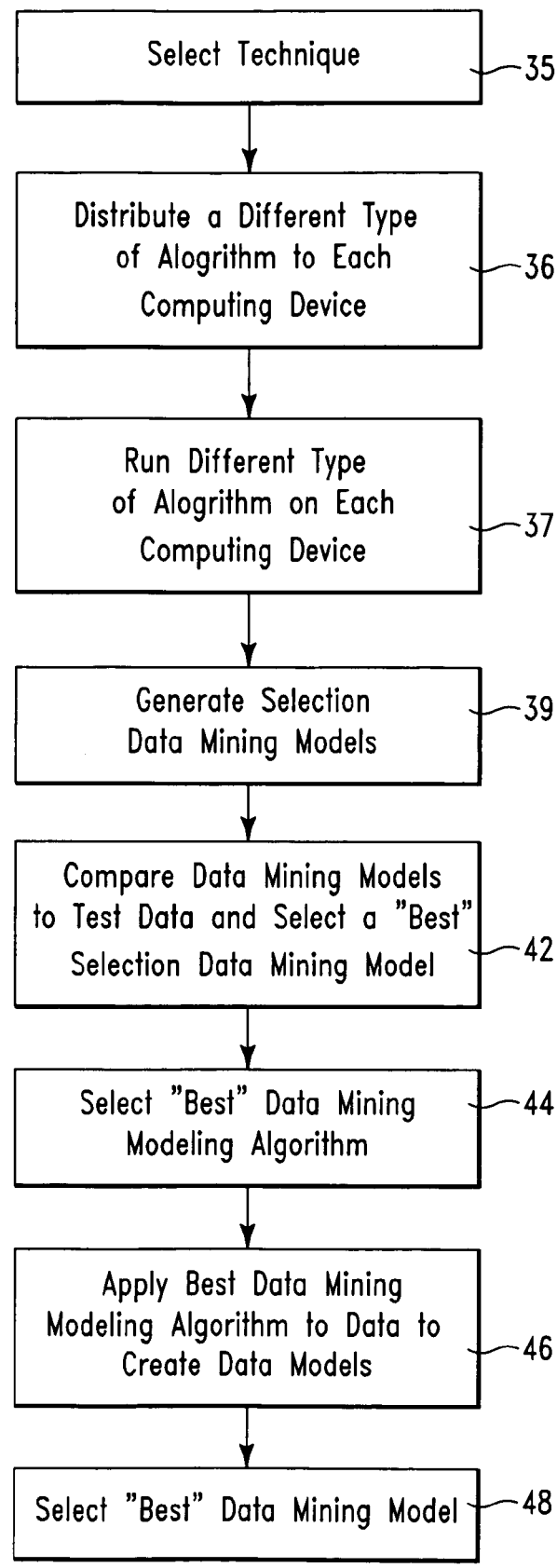
FIG. 3 illustrates a flowchart comprising an algorithm used by database system of FIG. 1 for selecting a "best" data mining modeling algorithm, generating data mining models using the "best" data mining modeling algorithm, and selecting a "best" data mining model, in accordance with embodiments of the present invention.

FIG. 3 illustrates a flowchart comprising an algorithm used by database system 2 of FIG. 1 for selecting a "best" data mining modeling algorithm, generating data mining models using the "best" data mining modeling algorithm, and selecting a "best" data mining model, in accordance with embodiments of the present invention. In step 35, a technique is selected for selecting a "best" data mining modeling algorithm and generating data mining models applied to each of the data subsets 8A . . . 8F to determine a "best" data mining model. The selected techniques may include, inter alia, a lift chart technique, a root mean squared technique, etc. as described and defined in the description of FIG. 1. In step 36, the administrator computing apparatus 29 transmits simultaneously, a different data mining modeling algorithm from a plurality of data mining modeling algorithms 33 to each of data subsets 6A . . . 6F within each of computing devices 20 . . . 23 and 24 . . . 25. In step 37 each different data mining modeling algorithm is run simultaneously, using the selected technique from step 35, on each of data subsets 6A . . . 6F within each of computing devices 20 . . . 23 and 24 . . . 25. In step 39, a plurality of selection data mining models are simultaneously generated. In step 42, the administrator computing apparatus 29 compares each of the generated selection data mining models to test data 4 a "best" selection data mining model is selected. In step 44, a "best" data mining modelling algorithm is selected. The "best" data mining modelling algorithm is associated with the "best" selection data mining model. The "best" data mining modeling algorithm may comprise any type of data mining modeling algorithm including, inter alia, a decision tree algorithm, a clustering algorithm, a radial basis function algorithm, a linear regression algorithm, an associations algorithm, a neural network algorithm, etc. as described and defined in the description of FIG. 1. In step 46, the "best" data mining modelling algorithm is applied to each of data subsets 8A . . . 8F within each of computing devices 20 . . . 23 and 24 . . . 25 to create a plurality of data mining models. In step 48, a "best" data mining model is selected. The "best" data mining model comprises a highest degree of correlation to a desired product offer or service offer with respect to a customer(s).

Figure 4:
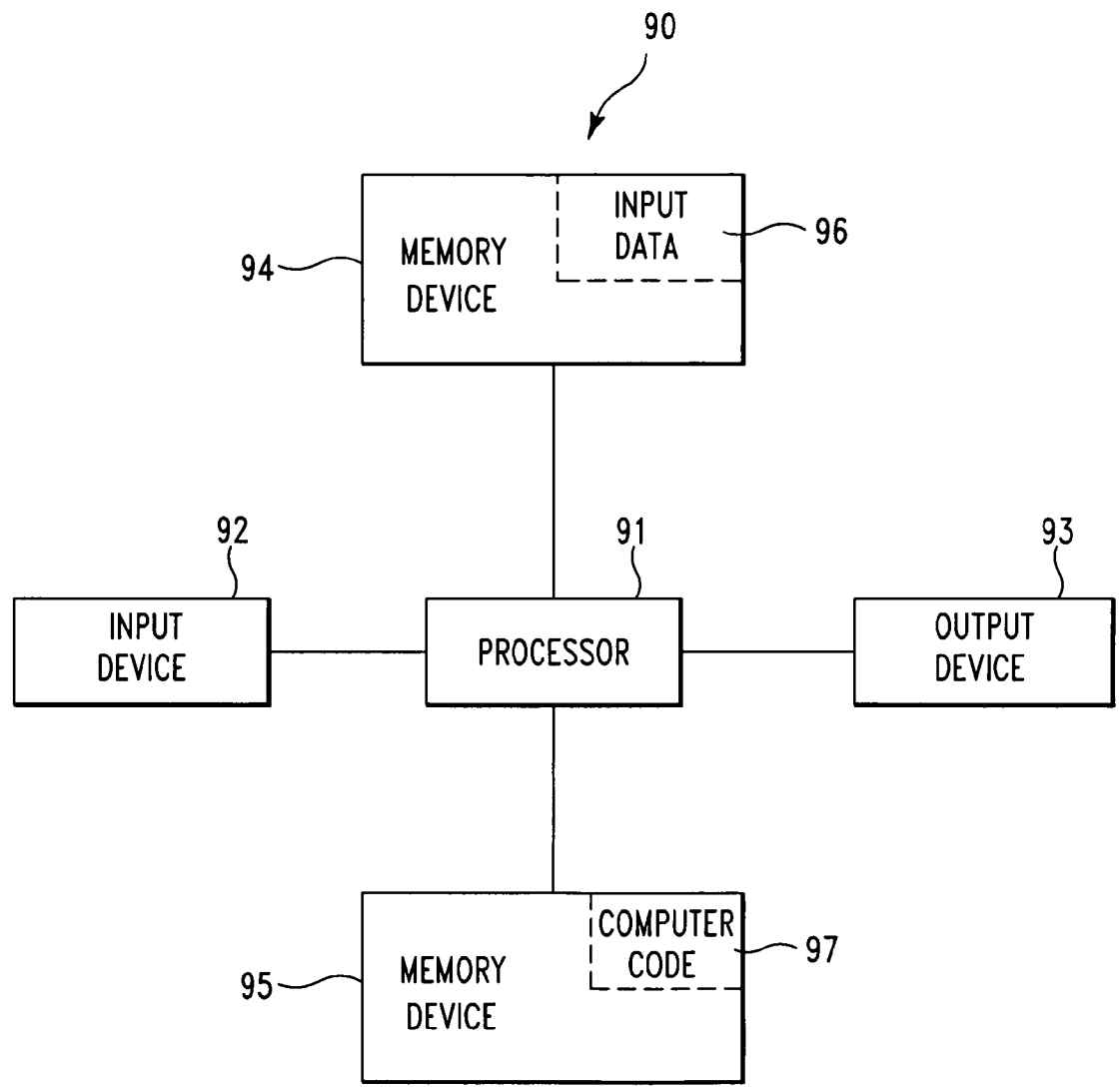
FIG. 4 illustrates a computer system used for implementing the database system of FIG. 1 for selecting a "best" data mining modeling algorithm to generate and select data mining models, in accordance with embodiments of the present invention.

FIG. 4 illustrates a computer system 90 used for implementing the database system 2 of FIG. 1 for selecting a "best" data mining modeling algorithm to generate and select data mining models, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for selecting a "best" data mining modeling algorithm to generate and select data mining models. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the database system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for selecting a "best" data mining modeling algorithm to generate and select data mining models.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data mining method, comprising:

providing a computing system comprising a computer readable medium and computing devices electrically coupled through an interface apparatus, wherein a plurality of different data mining modeling algorithms and test data are stored on said computer readable medium, wherein said test data comprises a known outcome associated with a marketing offer, wherein each of said computing devices comprises at least one central processing unit (CPU) and an associated memory device, and wherein each of said computing devices may not access each other computing device of said computing devices;

first receiving, by said computing system, a first steady data stream from a plurality of client spreadsheets;

first dividing, by the computing system, said first steady data stream into a first plurality of data subsets;

associating, by the computing system, each data subset of said first plurality of data subsets with a different customer number associated with a different customer;

first placing, by the computing system, a different data subset of said first plurality of data subsets in each said associated memory device, wherein said first receiving, said first dividing, and said first placing are performed simultaneously;

selecting a technique for generating a data mining model applied to each of said first plurality of data subsets, wherein said data mining model is used to predict future customer behavior based on past historical data, wherein said past historical data consists of a customer purchasing history and a customer returned items history;

running simultaneously, each of said different data mining modeling algorithms on a different associated data subset of said first plurality of data subsets using said selected technique to generate first data mining models on said computing devices, wherein a first associated data mining model of said first data mining models is stored on each of said computing devices;

comparing each of said first data mining models on each of said computing devices to said test data to determine a best selection data model of said first data mining models, determining, a best data mining modeling algorithm from said different data mining modeling algorithms in accordance with said selected technique, wherein said best data mining modeling algorithm is the data mining modeling algorithm that is associated with said best selection data mining model, and wherein said best data mining modeling algorithm is a neural network algorithm;

first removing each different data subset of said first plurality of data subsets from each said associated memory device;

after said first removing, second receiving by said computing system, a second steady data stream differing from said first steady data stream;

second dividing, by the computing system, said second steady data stream into a second plurality of data subsets;

second placing, by the computing system, a different data subset of said second plurality of data subsets in each said associated memory device, wherein said second receiving, said second dividing, and said second placing are performed simultaneously;

simultaneously applying said best data mining modeling algorithm to each data subset of said second plurality of data subsets;

generating in response to said simultaneously applying, second data mining models on said computing devices, wherein a second associated data mining model of said second data mining models is stored on each of said computing devices, wherein an output of each of said second data mining models comprises a numerical description representing an expected behavior for customers, and wherein each of said second data mining models is associated with a mortgage company; and comparing each of said second data mining models on each of said computing devices to each other data mining model of said second data mining models to determine a best data model of said second data mining models, wherein said best data model comprises a most predictive data model having a highest degree of correlation to an offer with respect to a customer of said customers as compared to all other data models of said second data mining models.

2. The data mining method of claim 1, wherein said test data comprises existing data related to a marketing offer accepted by a first plurality of candidates, and wherein each of said data mining models comprises an acceptance probability that said marketing offer will be accepted by a second plurality of candidates.

3. The data mining method of claim 2, wherein said best data mining model comprises a higher acceptance probability than said acceptance probabilities for any other of said data mining models.

4. The data mining method of claim 1, wherein said selected technique comprises a lift chart technique, and wherein said method further comprises:
   determining by said lift chart technique an effectiveness of each of said generated data mining models.

5. The data mining method of claim 1, wherein said selected technique comprises a root mean squared technique, and wherein said method further comprises:
   determining by said root mean squared technique, an error for each of said generated data mining models.

6. The data mining method of claim 1, wherein each of said data mining modeling algorithms are selected from the group consisting of a decision tree algorithm, a clustering algorithm, a radial basis function algorithm, a linear regression algorithm, an associations algorithm, and a neural network algorithm.

7. The data mining method of claim 1, wherein said interface apparatus is a high speed switching apparatus.

8. The data mining method of claim 1, wherein said computing system comprises a system selected from the group consisting of a massively parallel processing system, a symmetric multiprocessing system, and a combination of a massively parallel processing system and a symmetric multiprocessing system.

9. The data mining method of claim 1, wherein said computing system further comprises a relational database software system.

10. A computing system comprising a processor coupled to a computer readable medium and computing devices electrically coupled through an interface apparatus, wherein said computer readable medium comprises a plurality of different data mining modeling algorithms, test data, and instructions that when executed by the processor implement a data mining method, wherein said test data comprises a known outcome associated with a marketing offer, wherein each of said computing devices comprises at least one central processing unit (CPU) and an associated memory device, and wherein each of said computing devices may not access each other computing device of said computing devices, said method comprising the computer implemented steps of:
   first receiving, by said computing system, a first steady data stream from a plurality of client spreadsheets;
   first dividing, by the computing system, said first steady data stream into a first plurality of data subsets;
   associating, by the computing system, each data subset of said first plurality of data subsets with a different customer number associated with a different customer;
   first placing, by the computing system, a different data subset of said first plurality of data subsets in each said associated memory device, wherein said first receiving, said first dividing, and said first placing are performed simultaneously;
   selecting a technique for generating a data mining model applied to each of said first plurality of data subsets, wherein said data mining model is used to predict future customer behavior based on past historical data, wherein said past historical data consists of a customer purchasing history and a customer returned items history;
   running simultaneously, each of said different data mining modeling algorithms on a different associated data subset of said first plurality of data subsets using said selected technique to generate first data mining models on said computing devices, wherein a first associated data mining model of said first data mining models is stored on each of said computing devices;
   comparing each of said first data mining models on each of said computing devices to said test data to determine a best selection data model of said first data mining models,
   determining, a best data mining modeling algorithm from said different data mining modeling algorithms in accordance with said selected technique, wherein said best data mining modeling algorithm is the data mining modeling algorithm that is associated with said best selection data mining model, and wherein said best data mining modeling algorithm is a neural network algorithm;
   first removing each different data subset of said first plurality of data subsets from each said associated memory device;
   after said first removing, second receiving by said computing system, a second steady data stream differing from said first steady data stream;
   second dividing, by the computing system, said second steady data stream into a second plurality of data subsets;
   second placing, by the computing system, a different data subset of said second plurality of data subsets in each said associated memory device, wherein said second receiving, said second dividing, and said second placing are performed simultaneously;
   simultaneously applying said best data mining modeling algorithm to each data subset of said second plurality of data subsets;
   generating in response to said simultaneously applying, second data mining models on said computing devices, wherein a second associated data mining model of said second data mining models is stored on each of said computing devices, wherein an output of each of said second data mining models comprises a numerical description representing an expected behavior for customers, and wherein each of said second data mining models is associated with a mortgage company; and
   comparing each of said second data mining models on each of said computing devices to each other data mining model of said second data mining models to determine a best data model of said second data mining models, wherein said best data model comprises a most predictive data model having a highest degree of correlation to an offer with respect to a customer of said customers as compared to all other data models of said second data mining models.

11. The computing system of claim 10, wherein said test data comprises existing data related to a marketing offer accepted by a first plurality of candidates, and wherein each of said data mining models comprises an acceptance probability that said marketing offer will be accepted by a second plurality of candidates.

12. The computing system of claim 11, wherein said best data mining model comprises a higher acceptance probability than said acceptance probabilities for any other of said data mining models.

13. The computing system of claim 10, wherein said selected technique comprises a lift chart technique, and wherein said method further comprises:
   determining by said lift chart technique an effectiveness of each of said generated data mining models.

14. The computing system of claim 10, wherein said selected technique comprises and a root mean squared technique, and wherein said method further comprises:
   determining by said root mean squared technique, an error for each of said generated data mining models.

15. The computing system of claim 10, wherein each of said data mining modeling algorithms are selected from the group consisting of a decision tree algorithm, a clustering algorithm, a radial basis function algorithm, a linear regression algorithm, an associations algorithm, and a neural network algorithm.

16. The computing system of claim 10, wherein said interface apparatus is a high speed switching apparatus.

17. The computing system of claim 10, wherein said computing devices electrically coupled through said interface apparatus is a computing system selected from the group consisting of a massively parallel processing system, a symmetric multiprocessing system, and a combination of a massively parallel processing system and a symmetric multiprocessing system.

18. The computing system of claim 10, wherein said computing devices electrically coupled through said interface apparatus comprise a relational database software system.

19. A process for integrating computing infrastructure, comprising integrating computer-readable code into a computing system, wherein the code in combination with the computing system comprises a computer readable medium and computing devices electrically coupled through an interface apparatus, wherein a plurality of different data mining modeling algorithms and test data are stored on said computer readable medium, wherein said test data comprises a known outcome associated with a marketing offer, wherein each of said computing devices comprises at least one central processing unit (CPU) and an associated memory device, wherein each of said computing devices may not access each other computing device of said computing devices, and wherein the code in combination with the computing system is adapted to implement a method for performing the steps of:
   first receiving, by said computing system, a first steady data stream from a plurality of client spreadsheets;
   first dividing, by the computing system, said first steady data stream into a first plurality of data subsets;
   associating, by the computing system, each data subset of said first plurality of data subsets with a different customer number associated with a different customer;
   first placing, by the computing system, a different data subset of said first plurality of data subsets in each said associated memory device, wherein said first receiving, said first dividing, and said first placing are performed simultaneously;
   selecting a technique for generating a data mining model applied to each of said first plurality of data subsets, wherein said data mining model is used to predict future customer behavior based on past historical data, wherein said past historical data consists of a customer purchasing history and a customer returned items history;
   running simultaneously, each of said different data mining modeling algorithms on a different associated data subset of said first plurality of data subsets using said selected technique to generate first data mining models on said computing devices, wherein a first associated data mining model of said first data mining models is stored on each of said computing devices;
   comparing each of said first data mining models on each of said computing devices to said test data to determine a best selection data model of said first data mining models,
   determining, a best data mining modeling algorithm from said different data mining modeling algorithms in accordance with said selected technique, wherein said best data mining modeling algorithm is the data mining modeling algorithm that is associated with said best selection data mining model, and wherein said best data mining modeling algorithm is a neural network algorithm;
   first removing each different data subset of said first plurality of data subsets from each said associated memory device;
   after said first removing, second receiving by said computing system, a second steady data stream differing from said first steady data stream;
   second dividing, by the computing system, said second steady data stream into a second plurality of data subsets;
   second placing, by the computing system, a different data subset of said second plurality of data subsets in each said associated memory device, wherein said second receiving, said second dividing, and said second placing are performed simultaneously;
   simultaneously applying said best data mining modeling algorithm to each data subset of said second plurality of data subsets;
   generating in response to said simultaneously applying, second data mining models on said computing devices, wherein a second associated data mining model of said second data mining models is stored on each of said computing devices, wherein an output of each of said second data mining models comprises a numerical description representing an expected behavior for customers, and wherein each of said second data mining models is associated with a mortgage company; and
   comparing each of said second data mining models on each of said computing devices to each other data mining model of said second data mining models to determine a best data model of said second data mining models, wherein said best data model comprises a most predictive data model having a highest degree of correlation to an offer with respect to a customer of said customers as compared to all other data models of said second data mining models.

20. The process of claim of claim 19, wherein said test data comprises existing data related to a marketing offer accepted by a first plurality of candidates, and wherein each of said data mining models comprises an acceptance probability that said marketing offer will be accepted by a second plurality of candidates.

21. The process of claim 20, wherein said best data mining model comprises a higher acceptance probability than said acceptance probabilities for any other of said data mining models.

22. The process of claim 19, wherein said selected technique comprises a lift chart technique, and wherein said method further comprises:
   determining by said lift chart technique an effectiveness of each of said generated data mining models.

23. The process of claim 19, wherein said selected technique comprises and a root mean squared technique, and wherein said method further comprises:
   determining by said root mean squared technique, an error for each of said generated data mining models.

24. The process of claim 19, wherein each of said data mining modeling algorithms are selected from the group consisting of a decision tree algorithm, a clustering algorithm, a radial basis function algorithm, a linear regression algorithm, an associations algorithm, and a neural network algorithm.

25. The process of claim 19, wherein said interface apparatus is a high speed switching apparatus.

26. The process of claim 19, wherein said computing system comprises a system selected from the group consisting of a massively parallel processing system, a symmetric multiprocessing system, and a combination of a massively parallel processing system and a symmetric multiprocessing system.

27. The process of claim 19, wherein said computing system further comprises a relational database software system.

28. A computer program product, comprising a computer usable medium having a computer readable program code embodied therein, said computer readable program code comprising an algorithm adapted to implement a data mining method within a computing system, said computing system comprising a computer readable medium and computing devices electrically coupled through an interface apparatus, wherein a plurality of different data mining modeling algorithms and test data are stored on said computer readable medium, wherein said test data comprises a known outcome associated with a marketing offer, wherein each of said computing devices comprises at least one central processing unit (CPU) and an associated memory device, and wherein each of said computing devices may not access each other computing device of said computing devices, said method comprising the steps of:
   first receiving, by said computing system, a first steady data stream from a plurality of client spreadsheets;
   first dividing, by the computing system, said first steady data stream into a first plurality of data subsets;
   associating, by the computing system, each data subset of said first plurality of data subsets with a different customer number associated with a different customer;
   first placing, by the computing system, a different data subset of said first plurality of data subsets in each said associated memory device, wherein said first receiving, said first dividing, and said first placing are performed simultaneously;
   selecting a technique for generating a data mining model applied to each of said first plurality of data subsets, wherein said data mining model is used to predict future customer behavior based on past historical data, wherein said past historical data consists of a customer purchasing history and a customer returned items history;
   running simultaneously, each of said different data mining modeling algorithms on a different associated data subset of said first plurality of data subsets using said selected technique to generate first data mining models on said computing devices, wherein a first associated data mining model of said first data mining models is stored on each of said computing devices;
   comparing each of said first data mining models on each of said computing devices to said test data to determine a best selection data model of said first data mining models,
   determining, a best data mining modeling algorithm from said different data mining modeling algorithms in accordance with said selected technique, wherein said best data mining modeling algorithm is the data mining modeling algorithm that is associated with said best selection data mining model, and wherein said best data mining modeling algorithm is a neural network algorithm;
   first removing each different data subset of said first plurality of data subsets from each said associated memory device;
   after said first removing, second receiving by said computing system, a second steady data stream differing from said first steady data stream;
   second dividing, by the computing system, said second steady data stream into a second plurality of data subsets;
   second placing, by the computing system, a different data subset of said second plurality of data subsets in each said associated memory device, wherein said second receiving, said second dividing, and said second placing are performed simultaneously;
   simultaneously applying said best data mining modeling algorithm to each data subset of said second plurality of data subsets;
   generating in response to said simultaneously applying, second data mining models on said computing devices, wherein a second associated data mining model of said second data mining models is stored on each of said computing devices, wherein an output of each of said second data mining models comprises a numerical description representing an expected behavior for customers, and wherein each of said second data mining models is associated with a mortgage company; and
   comparing each of said second data mining models on each of said computing devices to each other data mining model of said second data mining models to determine a best data model of said second data mining models, wherein said best data model comprises a most predictive data model having a highest degree of correlation to an offer with respect to a customer of said customers as compared to all other data models of said second data mining models.

29. The computer program product of claim 28, wherein said test data comprises existing data related to a marketing offer accepted by a first plurality of candidates, and wherein each of said data mining models comprises an acceptance probability that said marketing offer will be accepted by a second plurality of candidates.

30. The computer program product of claim 29, wherein said best data mining model comprises a higher acceptance probability than said acceptance probabilities for any other of said data mining models.

31. The computer program product of claim 28, wherein said selected technique comprises a lift chart technique, and wherein said method further comprises:
   determining by said lift chart technique an effectiveness of each of said generated data mining models.

32. The computer program product of claim 28, wherein said selected technique comprises and a root mean squared technique, and wherein said method further comprises:
   determining by said root mean squared technique, an error for each of said generated data mining models.

33. The computer program product of claim 28, wherein each of said data mining modeling algorithms are selected from the group consisting of a decision tree algorithm, a clustering algorithm, a radial basis function algorithm, a linear regression algorithm, an association algorithm, and a neural network algorithm.

34. The computer program product of claim 28, wherein said interface apparatus is a high speed switching apparatus.

35. The computer program product of claim 28, wherein said computing system comprises a system selected from the group consisting of a massively parallel processing system, a symmetric multiprocessing system, and a combination of a massively parallel processing system and a symmetric multiprocessing system.

36. The computer program product of claim 28, wherein said computing system further comprises a relational database software system.

* * * * *